(12) United States Patent
Rhee et al.

(10) Patent No.: US 7,083,215 B2
(45) Date of Patent: Aug. 1, 2006

(54) DOUBLE CAM LOCKING HINGES FOR FOLDING REAR SEAT

(75) Inventors: Que-Whang Rhee, Ann Arbor, MI (US); Jason Roy Oliver, Adrian, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 392 days.

(21) Appl. No.: 10/664,185

(22) Filed: Sep. 17, 2003

(65) Prior Publication Data

US 2005/0057084 A1   Mar. 17, 2005

(51) Int. Cl.
*B60N 2/20* (2006.01)
(52) U.S. Cl. ............................. 296/65.16; 297/378.13
(58) Field of Classification Search ............ 296/65.03, 296/65.05, 65.09, 65.16; 297/15, 378.13
See application file for complete search history.

(56) References Cited

U.S. PATENT DOCUMENTS

| | | | |
|---|---|---|---|
| 4,708,385 A | * | 11/1987 | Kondo ..................... 296/65.17 |
| 4,958,877 A | * | 9/1990 | Lezotte et al. ............ 296/65.17 |
| 5,263,763 A | * | 11/1993 | Billette ..................... 296/65.17 |
| 5,273,336 A | * | 12/1993 | Schubring et al. ........ 296/65.17 |
| 5,685,612 A | | 11/1997 | MacDonald et al. ..... 297/378.1 |
| 5,700,058 A | * | 12/1997 | Balagurumurthy et al. ...... 297/440.15 |
| 5,803,549 A | * | 9/1998 | Bolsworth et al. ....... 297/463.1 |

FOREIGN PATENT DOCUMENTS

| | | | |
|---|---|---|---|
| JP | 62074731 A | * | 4/1987 |
| JP | 06166354 A | * | 6/1994 |

* cited by examiner

*Primary Examiner*—Joseph D. Pape
(74) *Attorney, Agent, or Firm*—Gifford, Krass, Groh, Sprinkle, Anderson & Citkowski, P.C.

(57) ABSTRACT

A device is provided for securing a seat back to a vehicle. The device includes a base that is mounted on the floor of the vehicle. The base includes a spool that can be partitioned to create separate areas upon which the seat backs can be mounted. The device also includes a first hinge that is mounted on the outer side of the seat back. The first hinge can include a pin that is comprised of two portions. The first portion of the pin extends normal to the seat back, and the second portion of the pin extends at an angle therefrom. The device further includes a second hinge that is mounted on the inner side of the seat back. The second hinge includes a slot that is configured to cooperate with the spool of the base mounted on the floor to attach the seat back to the vehicle.

19 Claims, 3 Drawing Sheets

DOUBLE CAM LOCKING HINGES FOR FOLDING REAR SEAT

BACKGROUND OF THE INVENTION

1. Field of the Invention

The present invention relates to hinges for a folding seat back and, more particularly, hinges having an angularly shaped pin and/or a partitioned spool for a rear seat back.

2. Description of the Prior Art

Generally, the installation of seat back frames to a vehicle is a difficult and costly process. In a typical installation process, a center pivot bracket is bolted to the floor of the vehicle and the seat back frames are then bolted to the bracket for pivoting. Because this assembly process takes an undesirably long period of time to accomplish, the process imposes an additional manufacturing cost. Moreover, the installation of a rear seat poses an ergonomic burden on the line worker. In a typical seat back installation, the seat trim and the foam portions can obstruct the view of the line worker, which results in a blind attachment assembly operation. This blind attachment can substantially slow the vehicle assembly process and increase manufacturing costs. In addition, to accomplish the assembly process, the line worker must enter and exit the vehicle multiple times, further slowing the manufacturing process as well as increasing the risk of injury.

One attempt to address the ergonomic issues of the seat back installation process is disclosed in U.S. Pat. No. 5,685,612 issued to McDonald et al. McDonald discloses a pivot bracket assembly used to install seat backs. The bracket assembly includes a hinge mounted on the vehicle floor. The hinge includes two spring biased cam latches. The cam latches are spring biased to remain in a closed position until a force is exerted upon them sufficient to overcome the spring bias. The pivot bracket assembly also includes a set of pins mounted at the bottom of each seat back. To install the seat backs, a line worker must simply position the pin of the seat back over a receiving cam. Then the worker simply exerts enough pressure on the seat back to force the pin of the seat back to open the cam latch. Once the pin is inserted into the slot of the cam, the cam latch will close thereby securing the seat back to the vehicle.

One of the drawbacks of such a system lies in the realm of safety concerns. In such systems, the seat backs are typically affixed to the vehicle using bolts. In the event of a rear end collision, heavy objects in the vehicle trunk may be forced against the seat back, and bolt attachments tend to effectively prevent these heavy objects from intruding into the passenger cabin of the vehicle. However, the installation of these bolt attachments raise ergonomic issues at the plant where the vehicle is manufactured. Accordingly, it is desired to have a hinge assembly that addresses one or more of the above-mentioned issues.

SUMMARY OF THE INVENTION

The invention relates to a hinge assembly for a rear seat back in a vehicle. The configuration of the pin located on the seat backs, as well as the improved spool design of the floor mounted hinge, allow for a more cost-efficient installation and improved safety. The hinge assembly includes a base that is mounted to the floor of the vehicle. The base has a spool, where the spool can include a partition that creates at least two separate areas upon which a seat back can be mounted. The device also includes a hinge that is mounted on the outer seat of the seat back. This hinge can also include a pin having two distinct and separate portions. The first portion of the pin extends normally from the seat back, and the second portion of the pin extends at an angle therefrom. The device further includes another hinge that is mounted on the inner side of the seat back. This hinge includes a slot that is configured to cooperate with the spool for attaching the seat back to the vehicle floor.

BRIEF DESCRIPTION OF THE DRAWINGS

Reference is made to the attached drawings of the present invention wherein reference numerals and descriptions refer to like parts throughout the several views and in which:

FIG. 4 is an exploded view of a base having a spool in accordance with the invention.

DETAILED DESCRIPTION OF THE PREFERRED EMBODIMENTS

Figure 1:
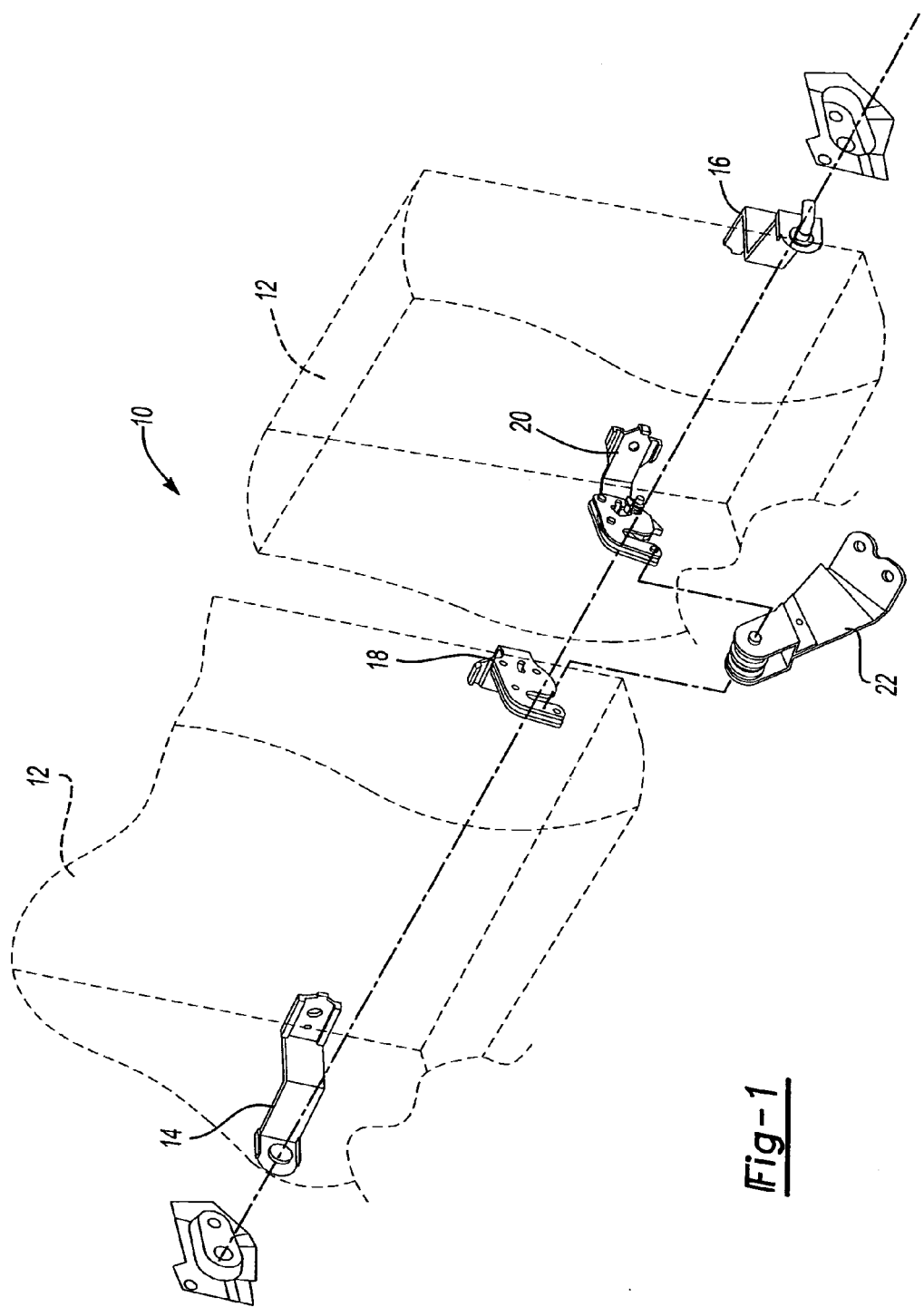
FIG. 1 is a perspective view of a vehicle with hinges in accordance with the invention.

Referring now to the drawings wherein like reference numerals are used to identify identical components in the various views, FIG. 1 illustrates one embodiment of a device 10 to secure a seat back 12 to a vehicle having a first and second outer hinge 14, 16, a first and second inner hinge 18, 20, and a base 22. The first and second outer hinges 14, 16 are generally configured to secure a seat back 12 to a vehicle. The first and second inner hinges 18, 20 are generally configured to cooperate with the base 22 to further secure a seat back 12 to a vehicle.

Figure 2:
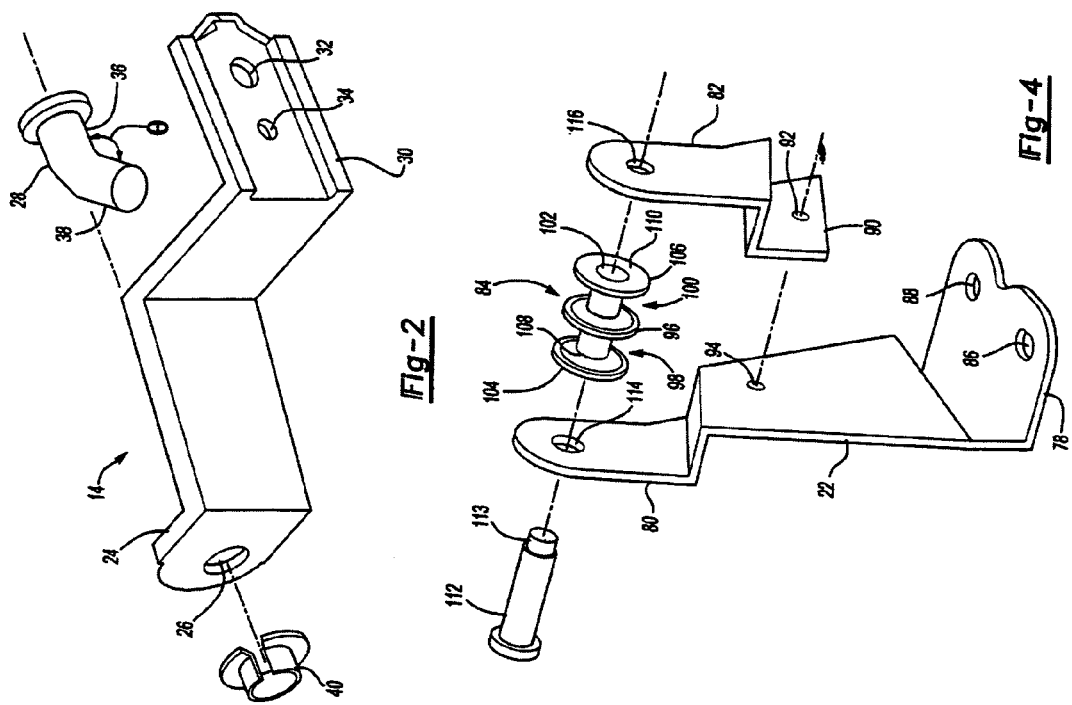
FIG. 2 is an exploded view of a first outer hinge having a pin in accordance with the invention.

Referring now to FIG. 2, the first outer hinge 14 has a first flange 24 having a bore 26 through which a pin 28 is inserted. The second flange 30 includes a bore 32 through which fasteners such as screws, bolts, pins and other equivalents can be inserted to secure the hinge 14 to a vehicle. The second flange 30 can also include a bore 34 that can be used by a line worker to manipulate any tooling needed in the assembly process. In the preferred embodiment, the first outer hinge 14 is generally L-shaped; however, other shapes can be used. The first flange 24 and the second flange 30 generally extend normal to the first outer hinge 14; however, the flanges 24, 30 can extend from the hinge 14 at other angles depending upon design requirements. The pin 28 is inserted through the bore 26 in the first flange 24 to secure the seat back 12 to a vehicle. The pin 28 has a first portion 36 which extends normal to the seat back 12 and a second portion 38 which extends at an angle θ from the first portion 36. In the preferred embodiment, θ is 135°; however, other angles can be used depending upon design requirements. The second outer hinge 16 is generally a mirror image of the first outer hinge 14. The pin 28 can be secured to the hinge 14 by a spacer 40. The spacer 40 is inserted on the portion 36. The spacer 40 is typically a bushing that prevents excessive looseness between the hinge 14 and the vehicle. The spacer 40 can also minimize any metal-to-metal contact between the hinge 14 and the vehicle. Minimizing metal-to-metal contact between the hinge 14 and the vehicle in turn minimizes undesired rattling and other such noise and improves the feel when the seat back 12 is folded and/or unfolded.

Figure 3:
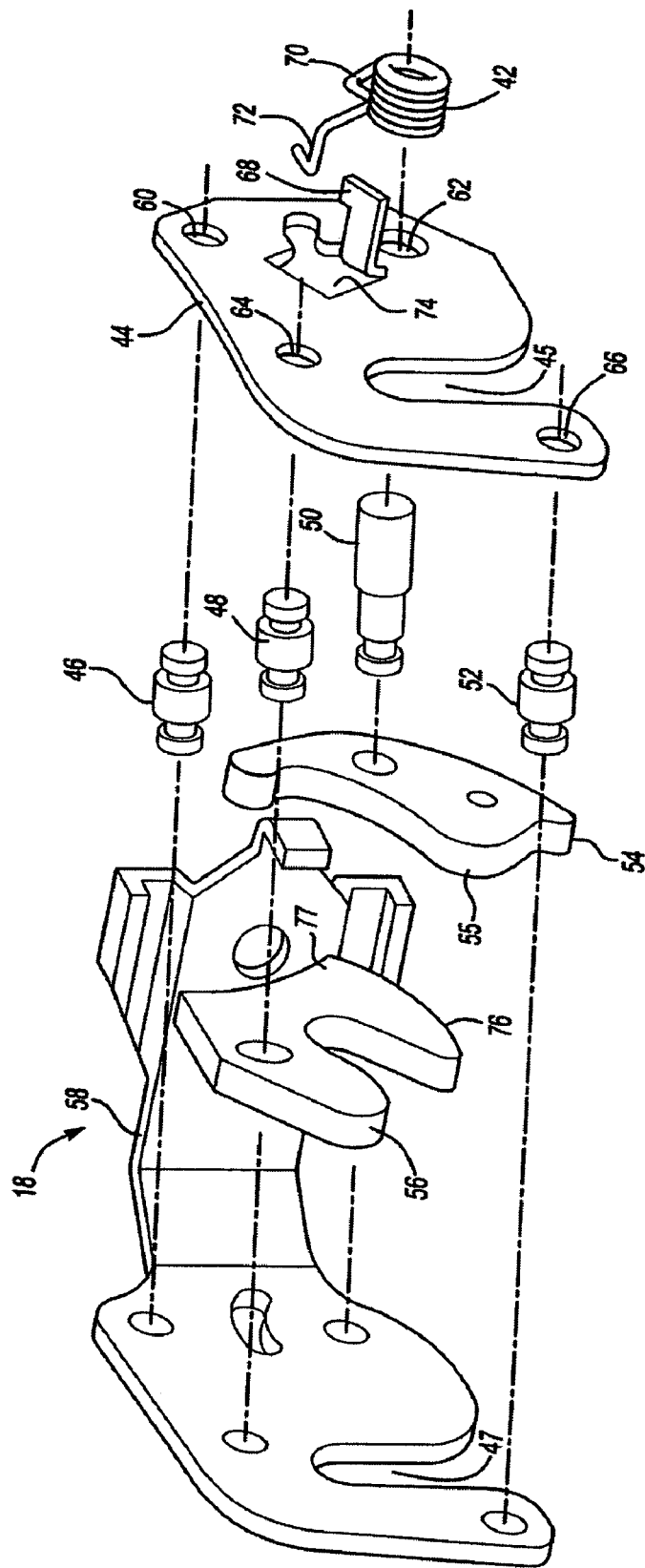
FIG. 3 is an exploded view of a first inner hinge having cams in accordance with the invention.

Referring now to FIG. 3, the first inner hinge 18 includes a spring 42, a plate 44, fasteners 46, 48, 50, 52, a first cam 54, a second cam 56, and a bracket 58. The plate 44 has a slot 45 which corresponds to a slot 47 on the bracket 58. The plate 44 also includes bores 60, 62, 64, 66 through which the fasteners 46, 48, 50, 52 are inserted. The plate 44 also has an anchor 68 upon which one end 70 of the spring 42 is secured. A second end 72 of the spring 42 is inserted through an opening 74 in the plate 44 and is secured on the first cam 54. The first cam 54 is pivotally affixed to the bracket 58 by the fastener 50. In the preferred embodiment, the fastener 50 is a pin; however, other conventional fasteners may be used. The second cam 56 is pivotally affixed to the bracket 58 by the fastener 48. The second cam 56 has a flange 76 that, in a default locked position, partially covers the slots 45, 47. This default locked position is created by a first portion 100 of a spool 84, discussed in detail below, which biases the second cam 56 to a closed position, and the spring 42 which biases the first cam 54 into a closed position. The first cam 54 and the second cam 56 can also be biased by the geometric relationship between the first cam 54, second cam 56, and friction to create a default open position, where a default open position is defined as when the slots 45, 47 are unobstructed by the second cam 56. The second inner hinge 20 is similarly configured to the first inner hinge 18, and includes substantially similar components.

Referring now to FIG. 4, the base 22 having a flange 78, a first arm 80, a second arm 82, and a spool 84 is illustrated. The flange 78 extends in a direction normal to the base 22. The flange 78 has bores 86, 88 through which fasteners (not shown) are inserted to affix the base 22 to a vehicle floor. The first arm 80 extends generally parallel to the base 22. The second arm 82 extends in a direction parallel to the base 22. The second arm 82 has a flange 90 having a bore 92 complementary to a bore 94 on the base 22. A conventional fastener, such as a screw, a nail, or a pin, is inserted through the bore 92 on the flange 90, through the bore 94 on the base 22 to attach the second arm 82 to the base 22. When second arm 82 is attached to the base 22, bores 114 and 116 will be aligned axially linearly. The spool 84 has a partition 96 to create a first portion 98 and the second portion 100. The spool 84 further includes a passageway 102. The passageway 102 and the partition 96 can be comprised of a single component, or they can be separate components. The partition 96 extends outwardly from the passageway 102. The spool 84 can also include a first end piece 104 and a second end piece 106. The first end piece 104 and the second end piece 106 are mounted at a first end 108 and a second end 110 respectively of the passageway 102. The first end piece 104 and the second end piece 106 extend outwardly away from the passageway 102. The spool 84 is affixed to the base 22 in between the first arm 80 and the second arm 82 by a pin 112 inserted through a bore 114 in the first arm 80, then through the passageway 102, and finally through a bore 116 in the second arm 82. Other fasteners, such as screws or nails, can also be used to affix the spool 84 to the base 22. The pin 112 can further include a tip 113 that receives a staking process to fix the pin 112 in place.

Referring to FIGS. 1 and 4, the first inner hinge 18 is mounted to the first portion 98 of the spool 84 on the base 22, and the second inner hinge 20 is mounted to the second portion 100 of the spool 84. To mount the first inner hinge 18 onto the first portion 98, the slots 45, 47 of the hinge 18 are aligned with the passageway 102 between the first end piece 104 and the partition 96. As the seat back 12 is pressed down onto the passageway 102, the second cam 56 of the hinge 18 is forced to pivot axially away from the passageway 102. Once the passageway 102 is inserted to the end of the slots 45, 47, the flange 76 pivots axially toward the passageway 102 and the cam 54 follows the motion of the cam 56. An outer edge 55 of the cam 54 pivotally slidably contacts an inner surface 77 of the cam 56 to lock the cam 56 into the default closed position, thus securing the seat back 12 to the base 22.

The discussion and examples hereinabove represent a specific embodiment of applications of the present invention. Within the guidelines given herein, one of skill in the art could readily recognize variations of the invention. Therefore, it is to be understood that the foregoing discussion, description, and example are illustrative of a particular embodiment of the present invention but are not meant to be limitations upon the practice thereof. It is the following claims, including all equivalents, which define the scope of the invention.

The invention claimed is:

1. A device for securing a seat back to a vehicle having a floor comprising:
    a base mounted on the floor, said base having a spool;
    a first hinge mounted on an outer side of the seat back, said first hinge having a pin whereby a first portion of said pin extends normal to the seat back and a second portion angularly extends therefrom; and
    a second hinge mounted on an inner side of the seat back, said second hinge having a slot to pivotally cooperate with said spool.

2. The device as recited in claim 1 wherein said spool has an axially extending passage.

3. The device as recited in claim 2 wherein said spool has a partition.

4. The device as recited in claim 3 wherein said partition is axially mounted about said passage.

5. The device as recited in claim 4 wherein said second hinge further includes a pivotally attached cam having a first flange, said first flange having a shape complementary to said passage for attachment thereto.

6. The device as recited in claim 1 wherein said base has a first end and a second end, said first end having a second flange attached to the floor, said second end having a first arm.

7. The device as recited in claim 6 wherein said base has a second arm whereby said spool is mounted between said first arm and said second arm.

8. The device as recited in claim 1 wherein said first hinge is attached to the vehicle by said pin.

9. The device as recited in claim 1 wherein the seat back pivots about an axis of rotation, said axis passing through said slot and said pin.

10. A device for securing a plurality of seat backs to a vehicle having a floor comprising:
    at least one base mounted on the floor, said base having a spool, said spool having an axially extending passage, said spool further having a partition axially mounted about said passage;
    at least one first hinge mounted on at least one outer side of the plurality of seat backs, said first hinge having at least one pin, said at least one pin having a first portion that extends generally normally relative to the seat backs and a second portion that extends angularly therefrom; and
    at least one second hinge mounted on at least one inner side of the plurality of seat backs, said second hinge having a slot to pivotally cooperate with said spool.

11. The device as recited in claim 10 wherein said first hinge is attached to the vehicle by said pin.

12. The device as recited in claim 10 wherein said second hinge further includes a pivotally attached cam having a first flange, said first flange having a shape complementary to said passage for attachment thereto.

13. The device as recited in claim 10 wherein said base has a first end and a second end, said first end having a second flange attached to the floor, said second end having a first arm.

14. The device as recited in claim 13 wherein said base has a second arm whereby said spool is mounted between said first arm and said second arm.

15. The device as recited in claim 10 wherein the seat backs pivot about an axis of rotation, said axis passing through said slot and said pin.

16. A device for securing a plurality of seat backs to a vehicle having a floor comprising:
   at least one base mounted on the floor, said at least one base having a spool, said spool having an axially extending passage, said spool further having a partition;
   at least one first hinge mounted on at least one outer side of the plurality of seat backs wherein said outer side is adjacent to the vehicle, said first hinge having a pin whereby a first portion of said pin extends normal to the seat backs and a second portion angularly extends therefrom and whereby said first hinge is attached to the vehicle by said pin; and
   at least one second hinge mounted on at least two inner sides of the seat backs wherein said inner sides are adjacent, said second hinge having a slot to pivotally cooperate with said spool.

17. The device as recited in claim 16 wherein said second hinge further includes a pivotally attached cam having a first flange, said first flange having a shape complementary to said passage for attachment thereto.

18. The device as recited in claim 16 wherein said base has a first end and a second end, said first end having a second flange attached to the floor, said second end having a first, said base further having a second arm whereby said spool is mounted between said first arm and said second arm.

19. The device as recited in claim 16 wherein the seat backs pivot about an axis of rotation, said axis passing through said slot and said pin.

* * * * *